(No Model.)
E. SAMUEL.
PINION WHEEL FOR TRACTION ENGINES.
No. 352,357. Patented Nov. 9, 1886.
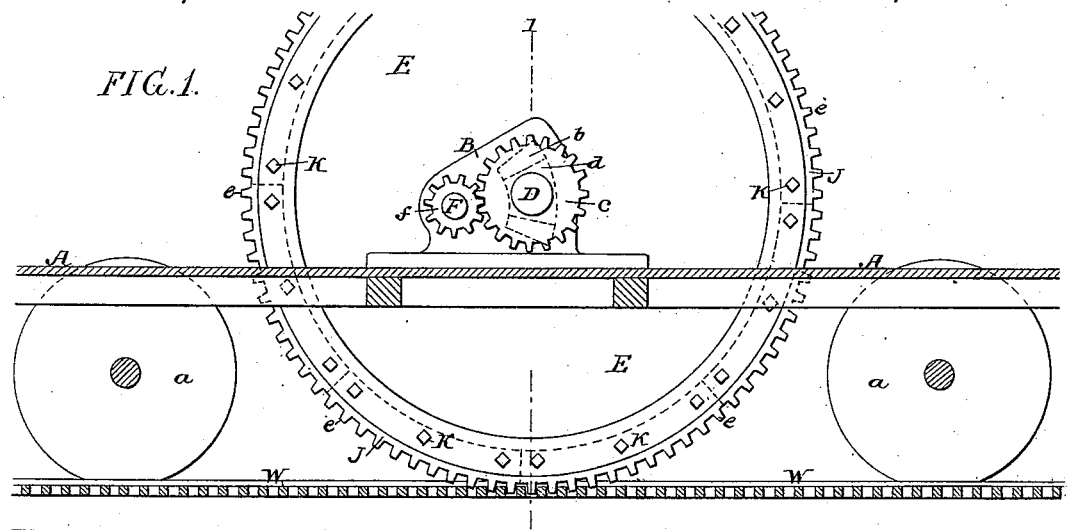
FIG. 1.
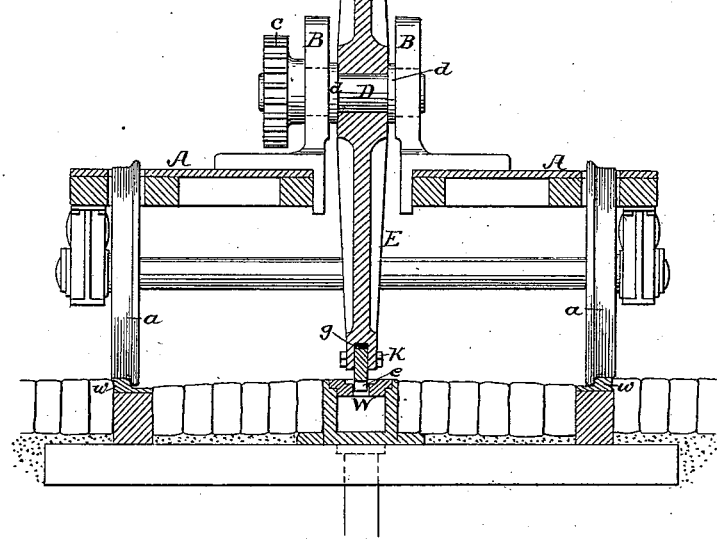
FIG. 2.
FIG. 3.
Witnesses:
David S. Williams
William D. Conner.
Inventor:
Edward Samuel
by his Attorneys
Howson & Sons

UNITED STATES PATENT OFFICE.

EDWARD SAMUEL, OF PHILADELPHIA, PENNSYLVANIA, ASSIGNOR TO WILLIAM WHARTON, JR., & CO., (LIMITED,) OF SAME PLACE.

PINION-WHEEL FOR TRACTION-ENGINES.

SPECIFICATION forming part of Letters Patent No. 352,357, dated November 9, 1886.

Application filed June 28, 1886. Serial No. 206,479. (No model.)

*To all whom it may concern:*

Be it known that I, EDWARD SAMUEL, a citizen of the United States, residing in Philadelphia, Pennsylvania, have invented certain Improvements in Pinion-Wheels for Traction-Engines, of which the following is a specification.

My invention relates to that class of traction devices for railways in which a pinion-wheel on the car engages with a rack on the roadway, the objects of my invention being to deaden noise, and to prevent the breaking of the wheel or rack when subjected to undue strain.

In the accompanying drawings, Figure 1 is a longitudinal section of a car and track, showing my improvement. Fig. 2 is a transverse section on the line 1 2, Fig. 1; and Fig. 3 is an enlarged section of part of the pinion-wheel.

A is the frame of the car, having the usual wheels, $a\ a$, and on this car are brackets B, to segmental slots $b$ in which are adapted the adjustable bearing-blocks $d$ for the shaft D of the traction-wheel E, which is situated in the present instance between the two bearings $d\ d$. (See Fig. 2.) This traction-wheel E is provided with teeth $e$, adapted to gear into a rack, W, on the roadway, the rack being in the present instance situated centrally between the two rails $w\ w$. The peculiar construction of this rack forms the subject of a separate application filed by me March 16, 1886, Serial No. 195,410; but it will be understood that I do not limit myself to this peculiar construction of rack, as a rack of the ordinary construction may be used. A spur-wheel, $c$, on the shaft D engages with a spur-pinion, $f$, on a shaft, F, to which the power is applied from any suitable motor. The teeth $e$ of the pinion traction-wheel are formed on segmental plates J, which are adapted to an annular groove in the wheel E, and are secured therein by transverse bolts K, which pass through radial slots $j$ in the plates.

Interposed between the inner faces of the segmental plates J and the bottom of the groove in the wheel E is an elastic filling-ring, $g$, preferably of rubber, so that the noise due to the engagement of the metal teeth and the metal rack is deadened, and the plates J are permitted to yield to a certain extent as the wheel traverses the rack W, excessive strain on the wheel or rack in the event of the insertion of any hard foreign substance between them being thus prevented.

I claim as my invention—

1. The combination of the wheel-body, the segmental plates carrying the teeth and free to yield radially on the wheel-body, and an elastic backing for said plates, all substantially as set forth.

2. The combination of the wheel-body, the toothed segmental plates having radial slots, the confining-bolts adapted to said slots, and the elastic backing for the plates, all substantially as set forth.

3. The combination of the wheel-body having an annular groove in its periphery, the toothed segmental plates adapted to said groove and free to move radially therein, and an elastic backing for said plates, all substantially as specified.

In testimony whereof I have signed my name to this specification in the presence of two subscribing witnesses.

EDWD. SAMUEL.

Witnesses:
   HENRY D. WHELDO,
   HARRY SMITH.